Patented Apr. 8, 1924.

1,489,684

UNITED STATES PATENT OFFICE.

LEWIS B. ALLYN, OF WESTFIELD, MASSACHUSETTS, ASSIGNOR TO VITAMIN FOOD COMPANY INCORPORATED, OF WILMINGTON, DELAWARE, A CORPORATION OF DELAWARE.

STABLE LIQUID AUTOLYZED YEAST AND METHOD OF PREPARING SAME.

No Drawing. Application filed October 11, 1922. Serial No. 593,811.

*To all whom it may concern:*

Be it known that I, LEWIS B. ALLYN, a citizen of the United States, residing in Westfield, county of Hampden, and State of Massachusetts, have invented certain new and useful Improvements in Stable Liquid Autolyzed Yeast and Methods of Preparing Same, of which the following is a specification.

This invention relates to a new product which consists in a liquid autolyzed yeast extract, which can be more readily handled than the known form of autolyzed yeast, the latter being a paste difficult to handle, but which on account of its high salt concentration keeps indefinitely. Autolyzed yeast when dissolved in water has its salt-content lowered and the yeast is then open to the growth of bacteria, resulting in destruction of the product or deterioration of its vitamin potency. By my invention I am able to reduce the autolyzed yeast paste to a fluid form, without affecting the vitamin which it carries and without lowering its resistance to the growth of bacteria. In my process I take the autolyzed yeast and dehydrate it to a point so that six to twelve pounds of yeast are reduced to one pound of yeast extract. I then take the concentrated autolyzed yeast and reduce the same to a fluid by adding a hydro-alcoholic solvent containing not less than 10% of alcohol, although the alcoholic-content can be increased up to 40%. A suitable solvent is re-inforced wine with 18% alcohol. Wine is particularly applicable because, if properly selected, its bouquet imparts a pleasant flavor to the product. I have found that fifteen parts of such solvent will reduce eighty parts of the concentrated yeast to a fluid form, although the quantity of solvent may be increased to 50% of the concentrated yeast, if desired.

My product thus prepared is very much more easily handled than the paste autolyzed yeast and will keep indefinitely, at ordinary temperatures. It may be bottled and used for all the usual uses to which autolyzed yeast is put.

Having described my invention, what I claim and desire to secure by Letters Patent is:

1. The method of liquefying autolyzed yeast extract, while maintaining its resistance to bacterial growth, which consists in lowering the moisture-content of the yeast and mixing therewith a hydro-alcoholic solvent such as reinforced wine.

2. The method of liquefying autolyzed yeast extract which consists in concentrating yeast extract, and mixing therewith a hydro-alcoholic solvent with at least 10% of alcohol.

3. The method of reducing autolyzed yeast paste to a fluid form, while maintaining its resistance to bacterial growth, which consists in reducing the moisture content of the autolyzed yeast so that one pound of the concentrate will represent from six to twelve pounds of yeast, and adding a hydro-alcoholic solvent with from 10% to 40% of alcohol-content.

4. As a new product, a fluid comprising autolyzed yeast in a hydro-alcoholic solvent containing from 10% to 40% of alcohol.

5. As a new product, a fluid comprising autolyzed yeast in a solvent of re-inforced wine.

In testimony whereof, I have signed my name in the presence of two witnesses.

LEWIS B. ALLYN.

Witnesses:
R. E. GARDNER,
R. A. PRINCE.